(12) United States Patent
Joshi et al.

(10) Patent No.: US 12,494,618 B2
(45) Date of Patent: Dec. 9, 2025

(54) VERTICAL EMITTERS WITH INTEGRATED FINAL-STAGE TRANSISTOR SWITCH

(71) Applicant: Apple Inc., Cupertino, CA (US)

(72) Inventors: Siddharth Joshi, Grenoble (FR); Keith Lyon, San Jose, CA (US); Arnaud Laflaquière, Paris (FR); Christophe Verove, Le Cheylas (FR)

(73) Assignee: Apple Inc., Cupertino, CA (US)

( * ) Notice: Subject to any disclaimer, the term of this patent is extended or adjusted under 35 U.S.C. 154(b) by 652 days.

(21) Appl. No.: 17/944,213

(22) Filed: Sep. 14, 2022

(65) Prior Publication Data

US 2024/0088623 A1    Mar. 14, 2024

(51) Int. Cl.
*H01S 5/026* (2006.01)
*H01S 5/042* (2006.01)
*H01S 5/42* (2006.01)

(52) U.S. Cl.
CPC ............ *H01S 5/0261* (2013.01); *H01S 5/042* (2013.01); *H01S 5/423* (2013.01)

(58) Field of Classification Search
CPC .................................................. H01S 5/0261
See application file for complete search history.

(56) References Cited

U.S. PATENT DOCUMENTS

| | | | | |
|---|---|---|---|---|
| 5,216,686 A | * | 6/1993 | Holm ....................... | H01S 5/183 372/50.1 |
| 5,266,794 A | * | 11/1993 | Olbright .............. | H04B 10/803 250/214 LS |
| 5,283,447 A | * | 2/1994 | Olbright ............. | H01S 5/18341 257/85 |
| 5,408,105 A | * | 4/1995 | Adachi ................... | H01S 5/423 257/97 |
| 5,500,540 A | | 3/1996 | Jewell et al. | |
| 5,867,513 A | | 2/1999 | Sato | |

(Continued)

FOREIGN PATENT DOCUMENTS

| CN | 1585217 A | 2/2005 |
|---|---|---|
| CN | 1632958 A | 6/2005 |

(Continued)

OTHER PUBLICATIONS

Choquette et al., "Advances in Selective Wet Oxidation of AlGaAs Alloys", IEEE Journal of Selected Topics in Quantum Electronics, vol. 3, issue 3, pp. 916-926, Jun. 1997.

(Continued)

*Primary Examiner* — James A Menefee
(74) *Attorney, Agent, or Firm* — Meitar Patents LTD.; Daniel Kligler (57) ABSTRACT

An integrated emitter device incudes a silicon die, including an array of control circuits, and a plurality of integrated emitter modules disposed on the silicon die. Each integrated emitter module includes a single epitaxial stack comprising multiple layers of III-V semiconductor compounds, which define a vertical emitter including an optically active layer and upper and lower distributed Bragg reflectors (DBRs) on opposing sides of the optically active layer, and a transistor in series with the vertical emitter and including a terminal in contact with a respective one of the control circuits, so as to actuate the vertical emitter in response to a control signal applied to the terminal by the respective one of the control circuits.

14 Claims, 7 Drawing Sheets

(56) References Cited

U.S. PATENT DOCUMENTS

| | | | |
|---|---|---|---|
| 5,892,786 A * | 4/1999 | Lott | H01S 5/0264 372/99 |
| 5,940,113 A | 8/1999 | Wilson | |
| 6,014,400 A | 1/2000 | Kobayashi | |
| 6,026,111 A | 2/2000 | Jiang et al. | |
| 6,057,560 A | 5/2000 | Uchida | |
| 6,201,825 B1 | 3/2001 | Sakuria et al. | |
| 6,317,446 B1 | 11/2001 | Wipiejewski | |
| 6,327,287 B1 | 12/2001 | Kner et al. | |
| 6,455,340 B1 | 9/2002 | Chua et al. | |
| 6,459,556 B1 | 10/2002 | Taguchi | |
| 6,519,271 B2 | 2/2003 | Kwon et al. | |
| 6,549,556 B1 | 4/2003 | Hwang et al. | |
| 6,583,445 B1 | 6/2003 | Reedy et al. | |
| 6,589,805 B2 | 7/2003 | Zhu et al. | |
| 6,798,806 B1 | 9/2004 | Johnson et al. | |
| 6,917,640 B2 | 7/2005 | Kwak | |
| 7,215,692 B2 | 5/2007 | Jewell | |
| 7,415,055 B2 | 8/2008 | Deng et al. | |
| 8,520,114 B2 | 8/2013 | Cok et al. | |
| 8,654,811 B2 | 2/2014 | Geske et al. | |
| 9,036,956 B2 | 5/2015 | Tseng et al. | |
| 9,038,883 B2 | 5/2015 | Wang et al. | |
| 9,157,790 B2 | 10/2015 | Shpunt et al. | |
| 9,389,069 B2 | 7/2016 | Bloom et al. | |
| 9,692,211 B2 | 6/2017 | Matsubara et al. | |
| 9,740,032 B2 | 8/2017 | Park et al. | |
| 9,742,153 B1 | 8/2017 | Barve et al. | |
| 9,825,425 B2 | 11/2017 | Mor | |
| 9,865,994 B2 | 1/2018 | Matsubara et al. | |
| 9,882,355 B2 * | 1/2018 | Gerlach | H01S 5/18308 |
| 10,082,633 B2 | 9/2018 | Schaevitz et al. | |
| 10,134,945 B1 | 11/2018 | Liu et al. | |
| 10,283,933 B1 | 5/2019 | Feng et al. | |
| 10,325,894 B1 | 6/2019 | Pan | |
| 10,825,952 B2 | 11/2020 | Laflaquiere et al. | |
| 11,335,794 B2 | 5/2022 | Kim | |
| 11,374,381 B1 | 6/2022 | Kriman et al. | |
| 2002/0042187 A1 | 4/2002 | Trezza et al. | |
| 2002/0075922 A1 | 6/2002 | Yoo et al. | |
| 2002/0150130 A1 | 10/2002 | Coldren et al. | |
| 2003/0169795 A1 | 9/2003 | Otoma et al. | |
| 2003/0194168 A1 | 10/2003 | Ouchi | |
| 2004/0099857 A1 | 5/2004 | Song et al. | |
| 2004/0120376 A1 | 6/2004 | Kwak | |
| 2004/0241892 A1 | 12/2004 | Colgan et al. | |
| 2005/0169343 A1 | 8/2005 | Ostermann et al. | |
| 2005/0189551 A1 | 9/2005 | Peng et al. | |
| 2006/0002444 A1 | 1/2006 | Wang et al. | |
| 2006/0013276 A1 | 1/2006 | McHugo | |
| 2006/0033114 A1 | 2/2006 | Schranz | |
| 2006/0227836 A1 | 10/2006 | Omori et al. | |
| 2007/0041411 A1 | 2/2007 | Pallec et al. | |
| 2007/0091961 A1 | 4/2007 | Lin et al. | |
| 2007/0120206 A1 | 5/2007 | Song et al. | |
| 2008/0080573 A1 | 4/2008 | Kawaguchi et al. | |
| 2009/0032908 A1 | 2/2009 | Masui et al. | |
| 2009/0161713 A1 | 6/2009 | Duggan et al. | |
| 2010/0029027 A1 | 2/2010 | Ikuta et al. | |
| 2010/0203660 A1 | 8/2010 | Tanaka | |
| 2010/0208764 A1 | 8/2010 | Otoma et al. | |
| 2010/0215070 A1 | 8/2010 | Hattori | |
| 2011/0064108 A1 | 3/2011 | Takaki et al. | |
| 2011/0182314 A1 | 7/2011 | Yoshikawa et al. | |
| 2011/0187878 A1 | 8/2011 | Mor et al. | |
| 2011/0241564 A1 | 10/2011 | Shimizu et al. | |
| 2012/0128020 A1 * | 5/2012 | Gerlach | H01S 5/0264 372/50.11 |
| 2013/0038881 A1 | 2/2013 | Pesach et al. | |
| 2013/0075761 A1 | 3/2013 | Akiyama | |
| 2013/0156060 A1 | 6/2013 | Futagawa et al. | |
| 2013/0216247 A1 | 8/2013 | Oba et al. | |
| 2013/0285115 A1 | 10/2013 | Wei et al. | |
| 2013/0286614 A1 | 10/2013 | Tan et al. | |
| 2014/0007935 A1 | 1/2014 | Multitu et al. | |
| 2014/0211215 A1 | 7/2014 | Pesach et al. | |
| 2015/0255955 A1 | 9/2015 | Wang et al. | |
| 2015/0333047 A1 | 11/2015 | Pfeuffer | |
| 2015/0340841 A1 | 11/2015 | Joseph | |
| 2016/0377414 A1 | 12/2016 | Thuries et al. | |
| 2017/0005455 A1 | 1/2017 | Padullaparth | |
| 2017/0256914 A1 | 9/2017 | Hsu et al. | |
| 2017/0353012 A1 | 12/2017 | Barve et al. | |
| 2018/0019302 A1 | 1/2018 | Deppe | |
| 2018/0122785 A1 | 5/2018 | Fiorentino et al. | |
| 2018/0234584 A1 * | 8/2018 | Kondo | H01S 5/18361 |
| 2018/0241177 A1 | 8/2018 | Wong et al. | |
| 2018/0287345 A1 | 10/2018 | Laflaquiere et al. | |
| 2019/0036308 A1 | 1/2019 | Carson et al. | |
| 2019/0164946 A1 | 5/2019 | Fu et al. | |
| 2019/0250257 A1 | 8/2019 | Finkelstein et al. | |
| 2019/0305522 A1 | 10/2019 | Yuen et al. | |
| 2019/0346641 A1 | 11/2019 | Schlepple et al. | |
| 2019/0363520 A1 | 11/2019 | Laflaquiere et al. | |
| 2020/0106245 A1 | 4/2020 | Barve et al. | |
| 2020/0169065 A1 | 5/2020 | Carson et al. | |
| 2020/0274328 A1 | 8/2020 | Park et al. | |
| 2020/0278426 A1 * | 9/2020 | Dummer | H01S 5/06835 |
| 2020/0313391 A1 | 10/2020 | Li et al. | |
| 2021/0013372 A1 | 1/2021 | Laflaquiere et al. | |
| 2021/0336422 A1 | 10/2021 | Tan et al. | |
| 2022/0328645 A1 * | 10/2022 | Huang | H01S 5/0206 |
| 2024/0047947 A1 | 2/2024 | Yuen et al. | |

FOREIGN PATENT DOCUMENTS

| | | |
|---|---|---|
| CN | 101026211 A | 8/2007 |
| CN | 101136538 A | 3/2008 |
| CN | 101447647 A | 6/2009 |
| CN | 101667716 A | 3/2010 |
| CN | 101841129 A | 9/2010 |
| CN | 102013633 A | 4/2011 |
| CN | 102354712 A1 | 2/2012 |
| CN | 102570301 A | 7/2012 |
| CN | 103050063 A | 4/2013 |
| CN | 104752952 A | 7/2015 |
| CN | 105706240 A | 6/2016 |
| CN | 106654860 A | 5/2017 |
| CN | 107196187 A | 9/2017 |
| CN | 107564993 A | 1/2018 |
| CN | 109378709 A | 2/2019 |
| CN | 110011181 A | 7/2019 |
| CN | 110338815 A | 10/2019 |
| CN | 110739604 A | 1/2020 |
| CN | 113823628 A | 12/2021 |
| EP | 0773614 A1 | 5/1997 |
| EP | 0887193 A1 | 12/1998 |
| EP | 0896405 A2 | 2/1999 |
| EP | 0949728 A1 | 10/1999 |
| EP | 1418631 A2 | 5/2004 |
| EP | 1533876 A2 | 5/2005 |
| JP | H09223848 A | 8/1997 |
| JP | H11168263 A | 6/1999 |
| JP | 2001068795 A | 3/2001 |
| JP | 3236774 B2 | 12/2001 |
| JP | 2003121611 A | 4/2003 |
| JP | 2005159071 A | 6/2005 |
| JP | 2006302981 A | 11/2006 |
| JP | 2009094308 A | 4/2009 |
| JP | 2009238815 A | 10/2009 |
| JP | 2011066125 A | 3/2011 |
| JP | 2013065692 A | 4/2013 |
| KR | 20140061117 A | 5/2014 |
| WO | 0245223 A1 | 6/2002 |
| WO | 2006003011 A1 | 1/2006 |
| WO | 2007027196 A2 | 3/2007 |
| WO | 2007116659 A1 | 10/2007 |
| WO | 2016122927 A1 | 8/2016 |

(56) References Cited

FOREIGN PATENT DOCUMENTS

| WO | 2018053378 A1 | 3/2018 |
|---|---|---|
| WO | 2019036383 A1 | 2/2019 |

OTHER PUBLICATIONS

Kumar et al., "Sacrificial etching of AlxGa1—xAs for III-V MEMS surface micromachining", Applied Physics A: Materials Science & Processing, vol. 88, Issue 4, pp. 711-714, Sep. 2007.

Kim et al., "Lateral wet oxidation of AlxGa1—xAs—GaAs depending on its structure", Applied Physics Letters 69, pp. 3357-3359, year 1996.

Pu et al.: "Hybrid Integration of VCSEL's to CMOS Integrated Circuits", IEEE Journal of Selected Topics in Quantum Electronics, vol. 5, No. 2, pp. 201-208, Mar./Apr. 1999.

Neff et al., "VCSEL/CMOS smart pixel arrays for free-space optical interconnects", Proceedings of the Third International Conference on Massively Parallel Processing Using Optical Interconnections, pp. 282-289, Oct. 27-29, 1996.

Matsuo et al., "Novel technology for hybrid integration of photonic and electronic circuits", IEEE Photonics Technology Letters, vol. 8, issue 11, pp. 1507-1509, Nov. 1996.

Liu, Y., "Heterogeneous Integration of OE Arrays With Si Electronics and Micro-optics", IEEE Transactions of Advanced Packaging, vol. 25, No. 1, pp. 43-49, Feb. 2002.

Talghader., "Integration of LEDs and VCSELs using fluidic self-assembly", SPIE Proceedings, vol. 3286, pp. 86-95, Jan. 28, 1998.

Lin et al., "Ultra-compact, high-yield intra-cavity contacts for GaAs/AlGaAs-based vertical-cavity surface-emitting lasers", Journal of Vacuum Science & Technology B, Nanotechnology and Microelectronics: Materials Processing, Measurement, and Phenomena, vol. 31, Section 1, pp. 011205-1-011205-6, Jan./Feb. 2013.

Sanchez et al., "Single- Mode Monolithic GaSB Vertical Cavity Surface-Emitting Laser", Optics Express, vol. 20, issue 14, pp. 15540-15546, year 2012.

U.S. Appl. No. 17/228,742 Office Action dated May 1, 2023.
CN Application # 202011405245.4 Office Action dated Jul. 6, 2023.
U.S. Appl. No. 17/228,742 Office Action dated Dec. 29, 2023.
U.S. Appl. No. 17/706,651 Office Action dated Dec. 19, 2023.
CN Application # 2020800129425 Office Action dated Feb. 7, 2024.
KR Application # 1020217026188 Office Action dated Aug. 11, 2022.

Shi et al., "Numerical Study of the Optical Saturation and Voltage Control of a Transistor Vertical-Cavity Surface-Emitting Laser," IEEE Photonics Technology Letters, vol. 20, No. 24, pp. 2141-2143, Dec. 15, 2008.

Then et al., "The Transistor Laser: Theory and Experiment," Proceedings of the IEEE, vol. 101, No. 10, pp. 2271-2298, Oct. 2013.

Zhou et al., "Monolithic Optoelectronic Switch Integrating a GaAs/AlGaAs Heterojunction Bipolar Transistor and a Vertical Cavity Surface Emitting Laser," Proceedings of LEOS'93, pp. 490-491, year 1993.

Ohiso et al., "Buried-heterostructure long-wavelength vertical-cavity surface-emitting lasers with InGaAsP/InP-GaAs/AlAs DBRs," Electronics Letters, IEE 2000, vol. 36, No. 1, pp. 39-40, Jan. 6, 2000.

Yeh et al., "Integration of GaAs vertical-cavity surface-emitting laser on Si by substrate removal," Applied Physics Letters, vol. 64, No. 12, pp. 1466-1467, Mar. 21, 1994.

NSM Archive, "Physical Properties of Semiconductors", p. 1, Aug. 23, 2016.

Lamy et al., "Design of an InGaAs/InP 1.55 μm electrically pumped VCSEL", Optical and Quantum Electronics, vol. 40, No. 14-15, pp. 1193-1198, Jun. 3, 2009.

NSM Archive, "Aluminium Gallium Arsenide—Optical Properties", pp. 1-2, Aug. 12, 2016.

U.S. Appl. No. 17/228,742 Office Action dated Apr. 23, 2024.
CN Application # 201780057434.7 Office Action dated Apr. 25, 2024.
CN Application # 202080024072.3 Office Action dated May 28, 2024.
CN Application # 202080024072.3 Office Action dated Oct. 12, 2024.
CN Application #202180031211.X Office Action dated Nov. 20, 2024.

* cited by examiner

VERTICAL EMITTERS WITH INTEGRATED FINAL-STAGE TRANSISTOR SWITCH

FIELD OF THE INVENTION

The present invention relates generally to semiconductor devices, and particularly to optoelectronic devices and methods for their manufacture.

BACKGROUND

In conventional, top-emitting optoelectronic devices, such as vertical-cavity surface-emitting lasers (VCSELs), the semiconductor substrate serves not only as the base for fabrication of the emitters, but also as the mechanical supporting carrier of the emitter devices after fabrication. The terms "top" and "front" are used synonymously in the present description and in the claims in the conventional sense in which these terms are used in the art, to refer to the side of the semiconductor substrate on which the VCSELs are formed (typically by epitaxial layer growth and etching). The terms "bottom" and "back" refer to the opposite side of the semiconductor substrate. These terms are arbitrary, since once fabricated, the VCSELs will emit light in any desired orientation.

Bottom-emitting VCSEL devices are also known in the art. In such devices, after fabrication of the epitaxial layers on a wafer substrate (typically a III-V semiconductor wafer, such as a GaAs wafer), the substrate is thinned away below the emitting bottom surfaces of the VCSELs. The top surfaces are typically attached to a heat sink, which can also provide mechanical support.

In some applications, an array of VCSELs is integrated with control circuits in a single chip by bonding together a III-V semiconductor substrate on which the VCSELs are fabricated with a silicon substrate on which control circuits for the VCSELs are fabricated. For example, PCT International Publication WO 2018/053378, whose disclosure is incorporated herein by reference, describes a method for manufacturing that includes fabricating an array of vertical emitters by deposition of multiple epitaxial layers on a III-V semiconductor substrate, and fabricating control circuits for the vertical emitters on a silicon substrate. Respective front sides of the vertical emitters are bonded to the silicon substrate in alignment with the control circuits. After bonding the respective front sides, the III-V semiconductor substrate is thinned away from respective back sides of the vertical emitters, and metal traces are deposited over the vertical emitters to connect the vertical emitters to the control circuits.

SUMMARY

Embodiments of the present invention that are described hereinbelow provide improved optoelectronic devices and methods for their production.

There is therefore provided, in accordance with an embodiment of the invention, an integrated emitter device, including a silicon die, which an array of control circuits, and a plurality of integrated emitter modules disposed on the silicon die. Each integrated emitter module includes a single epitaxial stack including multiple layers of III-V semiconductor compounds, which define a vertical emitter including an optically active layer and upper and lower distributed Bragg reflectors (DBRs) on opposing sides of the optically active layer, and a transistor in series with the vertical emitter and including a terminal in contact with a respective one of the control circuits, so as to actuate the vertical emitter in response to a control signal applied to the terminal by the respective one of the control circuits.

In a disclosed embodiment, the transistor includes a heterojunction bipolar transistor (HBT). Alternatively, the transistor includes a bipolar junction transistor (BJT).

In one embodiment, the transistor includes a base, a collector, and an emitter, all of which are outside a cavity defined by the upper and lower DBRs. Alternatively, the base and the collector are disposed over the upper DBR, outside a cavity of the vertical emitter, while the emitter of the transistor is disposed between the optically active layer and one or more of the layers of the upper DBR.

In a disclosed embodiment, the optically active layer includes quantum wells. Additionally or alternatively, the vertical emitter is configured as a vertical-cavity surface-emitting laser (VCSEL).

In some embodiments, the vertical emitter in each of the integrated emitter modules includes a III-V semiconductor substrate, wherein the lower DBR is disposed on the substrate, the optically active layer is disposed over the lower DBR, and the upper DBR is disposed over the optically active layer, and wherein the vertical emitter is configured to emit optical radiation through the III-V semiconductor substrate when the control signal is applied to the terminal of the transistor. In a disclosed embodiment, the terminal of the transistor is bonded to a contact on the silicon die, whereby the vertical emitter emits the optical radiation through the III-V semiconductor substrate in a direction away from the silicon die.

There is also provided, in accordance with an embodiment of the invention, a method for manufacturing, which includes fabricating an array of control circuits on a silicon die. A plurality of integrated emitter modules are fabricated, each integrated emitter module including a single epitaxial stack including multiple layers of III-V semiconductor compounds, which define a vertical emitter including an optically active layer and upper and lower distributed Bragg reflectors (DBRs) on opposing sides of the optically active layer, and a transistor in series with the vertical emitter and including a terminal. The terminal of the transistor in each of the integrated emitter modules is bonded to a respective one of the control circuits, whereby the vertical emitter is actuated in response to a control signal applied to the terminal by the respective one of the control circuits.

The present invention will be more fully understood from the following detailed description of the embodiments thereof, taken together with the drawings in which:

DETAILED DESCRIPTION OF EMBODIMENTS

In some integrated emitter devices, such as those described in the above-mentioned PCT International Publication WO 2018/053378, an array of vertical emitters, such as VCSELs, is bonded to a silicon substrate containing control and driver circuits for the emitters. For high output power and versatile wavelength selection, the emitters are typically made from a III-V semiconductor compound. The control circuits on the silicon substrate enable precise, individual control of the emitters in the array.

High-power pulsed emitters draw substantial peak currents during operation, at relatively high voltage. For example, a VCSEL emitting short, intense pulses may draw a peak current greater than 30 mA at a voltage of 4-5 V. To satisfy these needs, the control circuit for the emitter should have a high-power, high-voltage output stage, with a voltage supply in the range of 8 V or more to cover switching losses and other parasitics. Meeting these needs in control circuits that are implemented in CMOS logic on the silicon wafer generally calls for a large final-stage transistor with a large driver capacitor, operating at a high voltage that is outside the conventional CMOS operating range.

Embodiments of the present invention that are described herein address these difficulties by integrating a transistor in series with the vertical emitter, in the same III-V epitaxial stack as the vertical emitter. This transistor serves as the output stage in the drive circuit, thus obviating the need for a large final-stage transistor in the silicon control circuits and reducing the overall size, voltage, and power requirements of the control circuits. As a result, the silicon control circuits can operate at much lower voltage and power levels, for example at a standard voltage of 1-1.5 V and a base current of 100-200 µA.

In the disclosed embodiments, multiple integrated emitter modules implementing this principle are disposed on a silicon die comprising an array of control circuits. Each of these integrated emitter modules comprises a single epitaxial stack comprising multiple layers of III-V semiconductor compounds, which are deposited and patterned to define a vertical emitter and a transistor in series with the vertical emitter. The vertical emitter comprises an optically active layer, such as a quantum well layer, with upper and lower distributed Bragg reflectors (DBRs) on opposing sides of the optically active layer. One of the terminals of the transistor is mounted in electrical contact with a respective control circuit on the silicon die. To actuate the vertical emitter, the control circuit applies a control signal to the terminal, causing current to flow through the transistor, which then drives the vertical emitter to emit radiation.

In a disclosed embodiment, the III-V transistor comprises a heterojunction bipolar transistor (HBT), for example a GaAs HBT. Such transistors have high gain and fast frequency response, and thus can drive the vertical emitters to emit short, high-power optical pulses with sharp rising and falling edges. Because the HBT is current-controlled, it also obviates the need for a large driver capacitor in the silicon control circuit. Alternatively, for applications with lower power and speed requirements, the III-V transistor may comprise a bipolar junction transistor (BJT), made from a single semiconductor material with suitable doping of the regions of the transistor.

Figure 1:
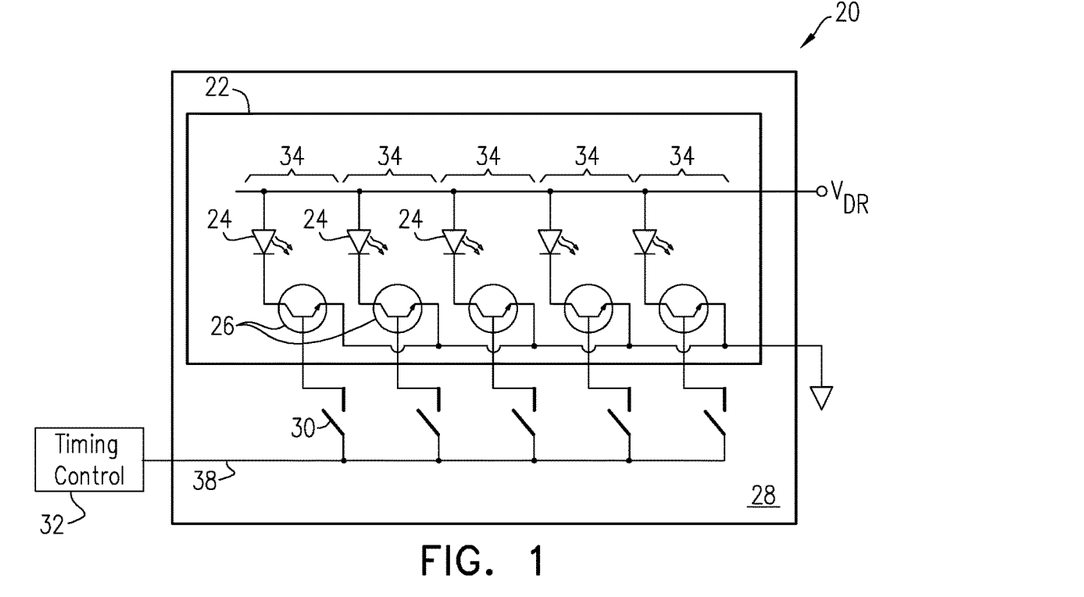
FIG. 1 is a block diagram that schematically illustrates an integrated emitter array device, in accordance with an embodiment of the invention.

FIG. 1 is a block diagram that schematically illustrates an integrated emitter array device 20, in accordance with an embodiment of the invention. Device 20 comprises a silicon die 28, on which an array of control circuits 30 is formed. For the sake of simplicity, control circuits 30 are represented as switches, typically made from suitable CMOS transistors, which are controlled via a bus 38 by timing control logic 32. Alternatively, more complex control circuits and topologies may be used.

A III-V semiconductor stamp 22 is bonded to silicon die 28, in alignment with control circuits 30. Stamp 22 may be produced by depositing and etching a stack of epitaxial layers on a III-V wafer, such as a GaAs wafer, as is described further hereinbelow. Stamp 22 in the pictured example comprises multiple integrated emitter modules 34, each aligned with a respective control circuit 30. Alternatively, each integrated emitter module on device 20 may be contained on a separate stamp. Each integrated emitter module 34 comprises a single epitaxial stack, comprising multiple layers of III-V semiconductor compounds, which define a vertical emitter, such as a VCSEL 24, and a bipolar transistor 26, such as an HBT, in series with the vertical emitter. In alternative embodiments, integrated emitter modules 34 may comprise other types of vertical emitters, such as resonant-cavity light-emitting diodes (RCLEDs).

One of the terminals of each transistor 26, such as the base terminal, is in contact with a respective control circuit 30. To actuate a given VCSEL 26, timing control logic 32 (which may also be implemented on silicon die 28) transmits a control pulse to the respective control circuit 30 via bus 38. In response to the control pulse, control circuit 30 applies a control signal to the terminal of transistor 26, which causes the corresponding VCSEL 24 to output a light pulse.

Figure 2:
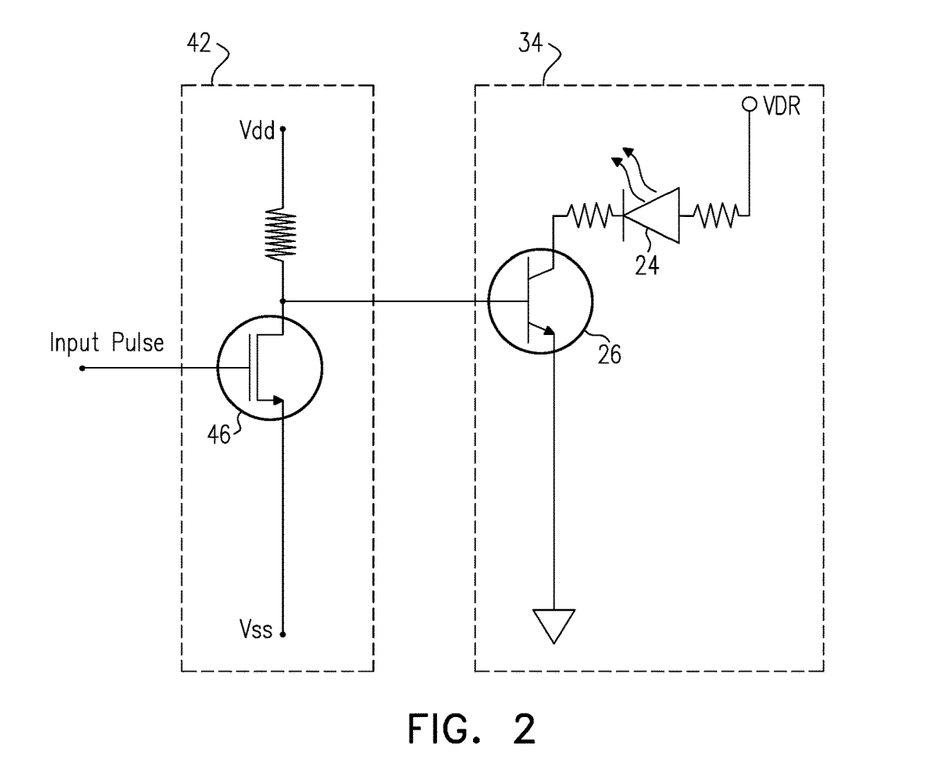
FIG. 2 is an electrical circuit diagram that schematically illustrates a VCSEL and associated switching circuits, in accordance with an embodiment of the invention.

FIG. 2 is an electrical circuit diagram that schematically illustrates integrated emitter module 34 and an associated control circuit 42, in accordance with an embodiment of the invention. Control circuit 42 is implemented on silicon die 28 and comprises a drive transistor 46, such as an NMOS transistor in the present example. Drive transistor 46 is connected to the base terminal of bipolar transistor 26 in emitter module 34, while the collector and emitter of transistor 26 are connected to the cathode of VCSEL 24 and to ground, respectively. The anode of VCSE 24 is connected to a positive drive voltage $V_{DR}$. When transistor 46 receives an input pulse, it applies a voltage pulse to the base of transistor 26, causing current to flow through emitter module 34 and thus actuating VCSEL 24 to emit a pulse of optical radiation.

Alternatively, other configurations of integrated emitter module 34 may be used. For example, the emitter of transistor 26 may be grounded, and a negative drive voltage applied to the cathode of VCSEL 24. As another alternative, although transistor 26 is shown in the figures as an NPN device, this transistor may alternatively be implemented as a PNP device, with appropriate changes to the other elements of emitter module 34 and control circuit 42. Although an HBT is advantageous in conveying high currents with fast frequency response, transistor 26 may alternatively comprise other types of bipolar junction transistors.

Similarly, the components of control circuit 42 may be replaced by other suitable sorts of silicon circuit components, including various sorts of bipolar CMOS (BiCMOS) circuit designs that are known in the art.

Figure 3A:
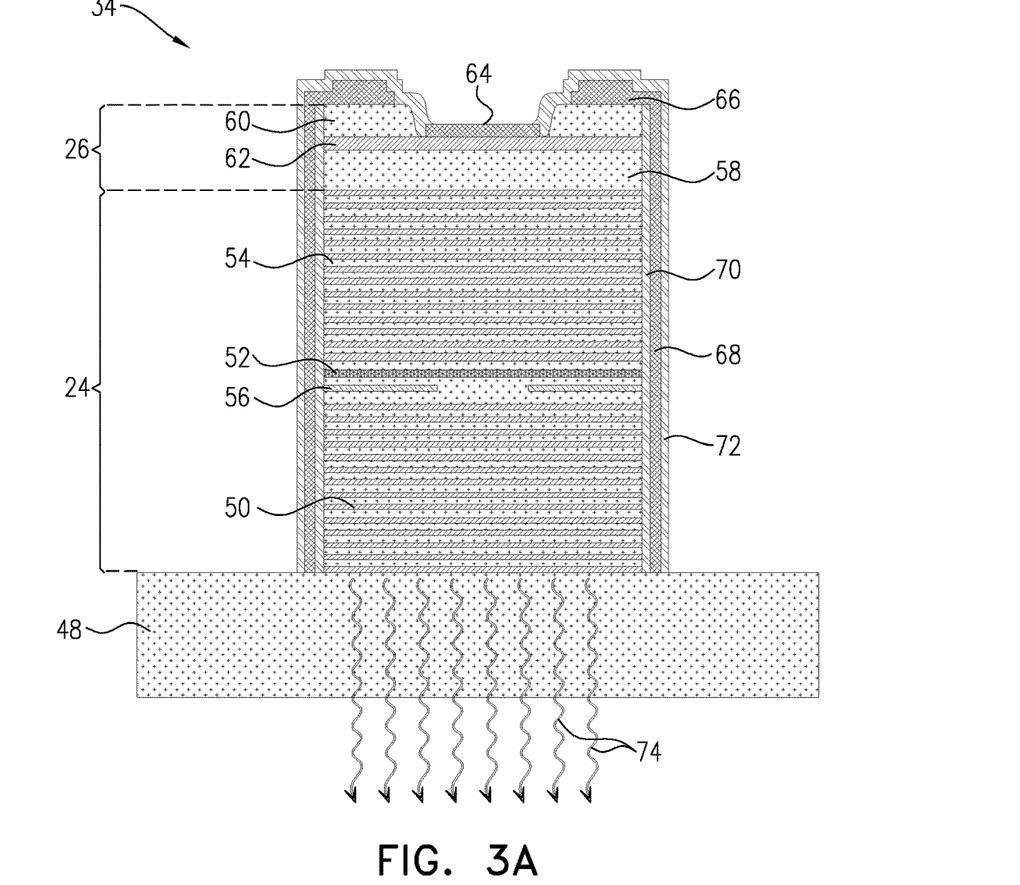
FIG. 3A is a schematic sectional view of an emitter module comprising a VCSEL with an integrated final-stage transistor, in accordance with an embodiment of the invention.
Figure 3B:
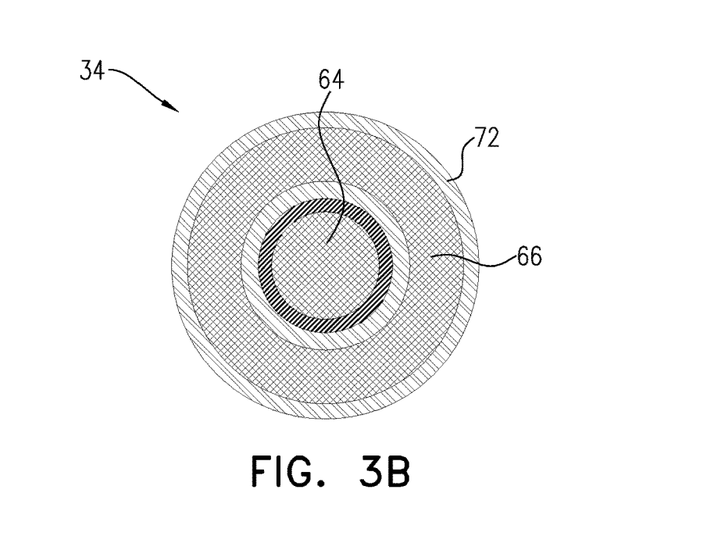
FIG. 3B is a schematic top view of the emitter module of FIG. 3A.

Reference is now made to FIGS. 3A and 3B, which schematically show details of emitter module 34, including VCSEL 24 and transistor 26, in accordance with an embodiment of the invention. FIG. 3A is a sectional view, while FIG. 3B is a top view.

Emitter module 34 comprises a III-V semiconductor substrate 48, for example a GaAs wafer. A lower distributed Bragg reflector (DBR) 50 comprises a stack of epitaxial layers of semiconductor compounds with alternating high and low refractive indexes, deposited on substrate 48. An optically active layer 52, comprising multiple quantum wells, for example, is deposited over lower DBR 50, along with an oxide aperture 56. An upper DBR 54, similarly comprising a stack of epitaxial layers of semiconductor compounds with alternating high and low refractive indexes, is deposited over optically active layer 52. In the present example, it is assumed that upper DBR 54 is n-doped, while lower DBR 50 is p-doped; but alternatively, other doping schemes may be used. When actuated by transistor 26 (in response to the control signal from control circuit 42), VCSEL 24 emits optical radiation 74 through substrate 48.

Transistor 26 comprises a set of epitaxial layers of semiconductor compounds, deposited over upper DBR 54, to define an emitter 58, a base 62, and a collector 60. In the present example, transistor 26 is configured as an NPN device, meaning that emitter 58 and collector 60 are n-doped, while base is p-doped. Alternatively, the doping may be reversed, so that transistor 26 is a PNP device (in which case, upper DBR 54 may be p-doped, while lower DBR 50 is n-doped). A base terminal 64 is deposited over base 62 and is bonded to a contact on silicon die 28, so that VCSEL 24 will emit optical radiation 74 through substrate 48 in a direction away from the silicon die. A collector terminal 66 is deposited over collector 60 and connects via a conducting metal layer 68 to the drive voltage (as shown in FIG. 2). Passivation layers 70 and 72 are formed over the mesa of emitter module 34, on the inner and outer sides of metal layer 68, respectively.

Figure 4A:
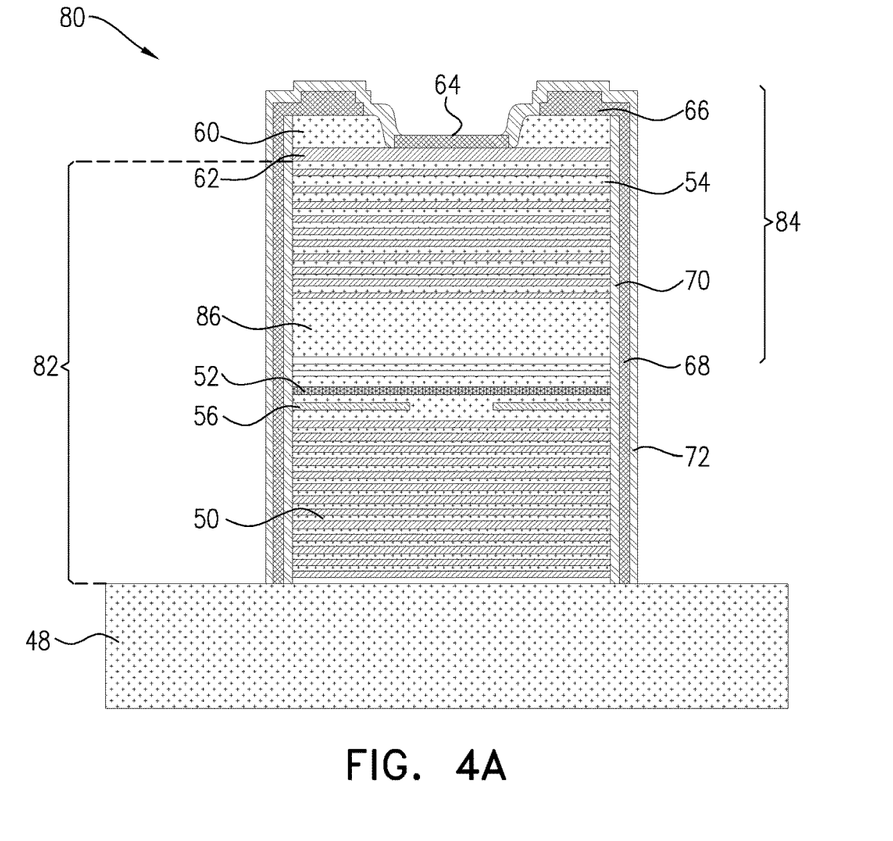
FIG. 4A is a schematic sectional view of an emitter module comprising a VCSEL with an integrated final-stage transistor, in accordance with another embodiment of the invention.
Figure 4B:
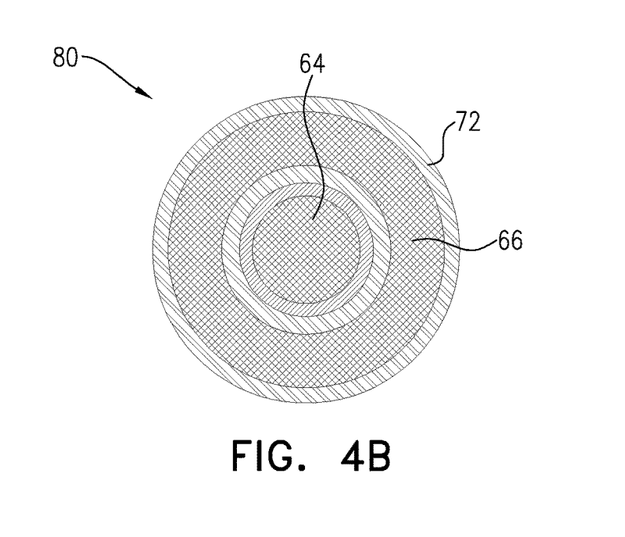
FIG. 4B is a schematic top view of the emitter module of FIG. 4A.

Reference is now made to FIGS. 4A and 4B, which schematically show details of an emitter module 80, including a VCSEL 82 and transistor 84, in accordance with an alternative embodiment of the invention. FIG. 4A is a sectional view, while FIG. 4B is a top view. Most of the components of emitter module 80 are similar to those of emitter module 34 (FIG. 3A/B) and are thus labeled with the same indicator numbers. In emitter module 80, however, while base 62 and collector 60 of transistor 84 are deposited over upper DBR 54, outside the cavity of VCSEL 82, an emitter 86 of the transistor is deposited between optically active layer 52 and one or more of the layers of upper DBR 54. This configuration adds resistance (due to the layers of upper DBR 54) within transistor 84 and can thus be advantageous in circuit configurations in which such higher resistance is desirable.

Figure 5A:
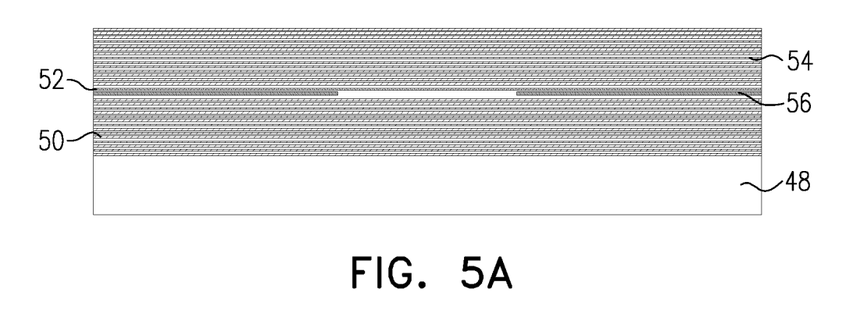
FIGS. 5A, 5B, 5C, 5D, 5E, 5F, 5G, 5H, and 5I are schematic sectional views illustrating stages in fabrication of an integrated emitter array, in accordance with another embodiment of the invention.
Figure 5B:
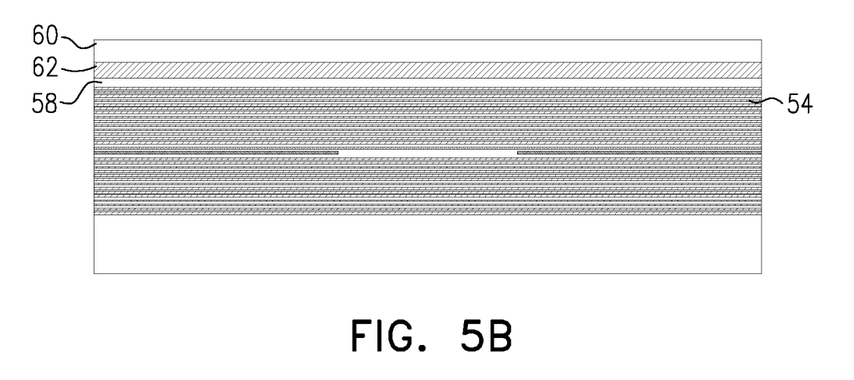
Figure 5C:
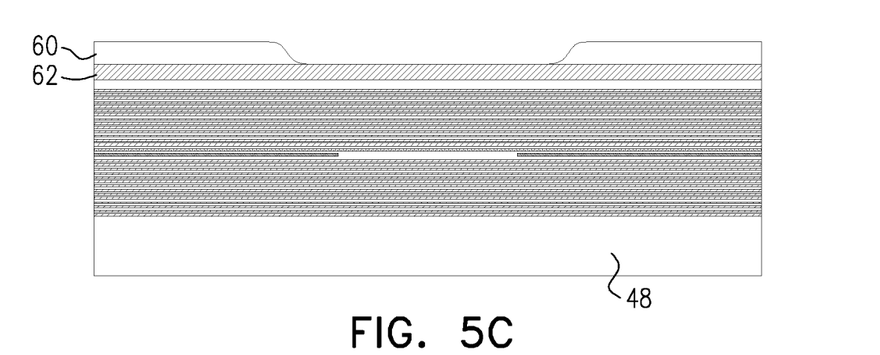
Figure 5D:
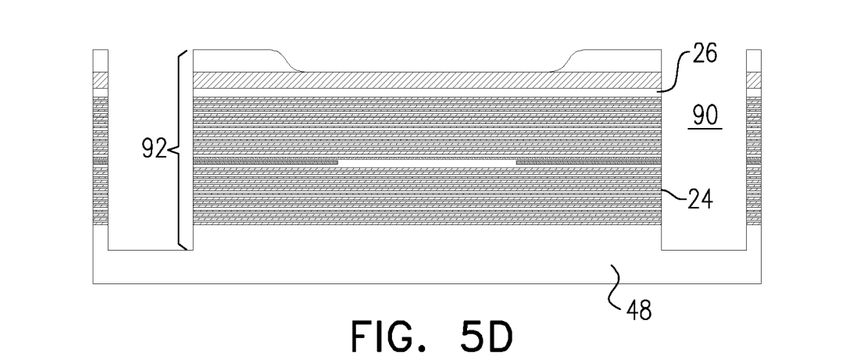
Figure 5E:
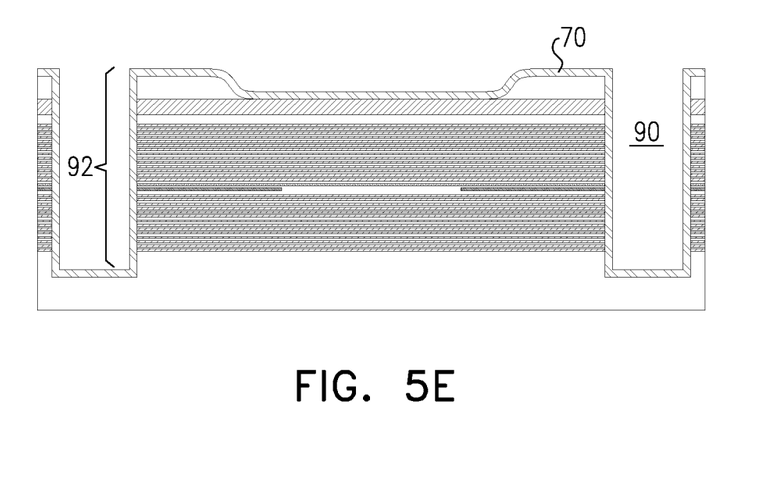
Figure 5F:
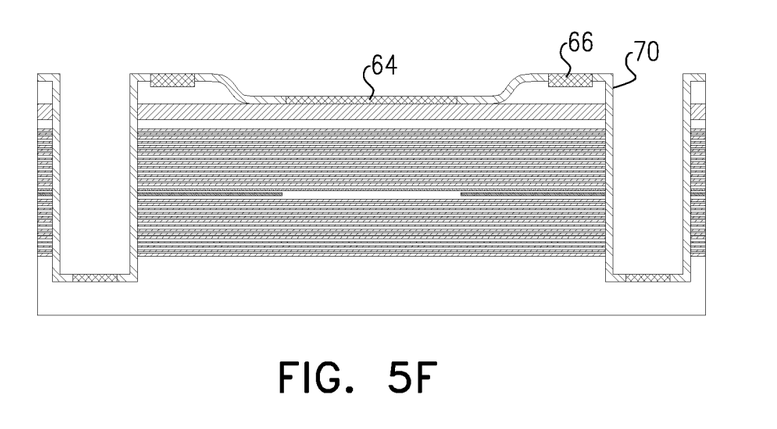
Figure 5G:
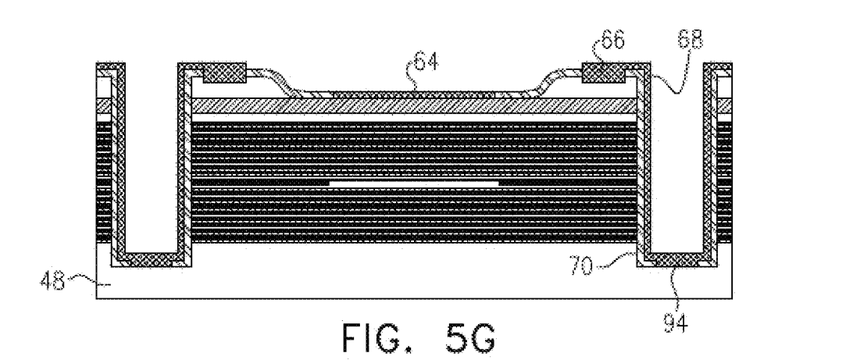
Figure 5H:
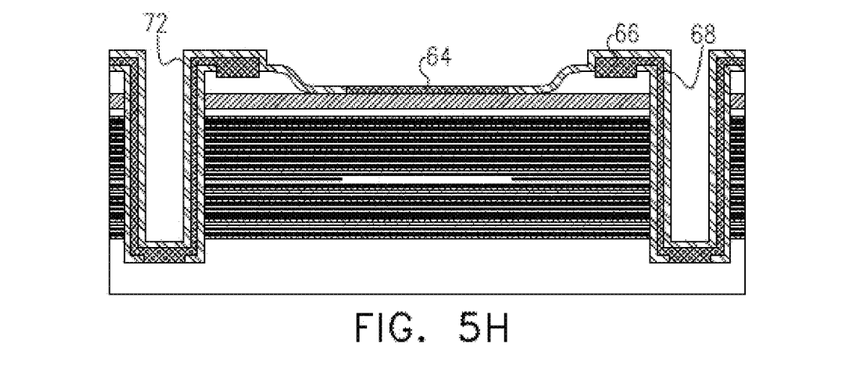
Figure 5I:
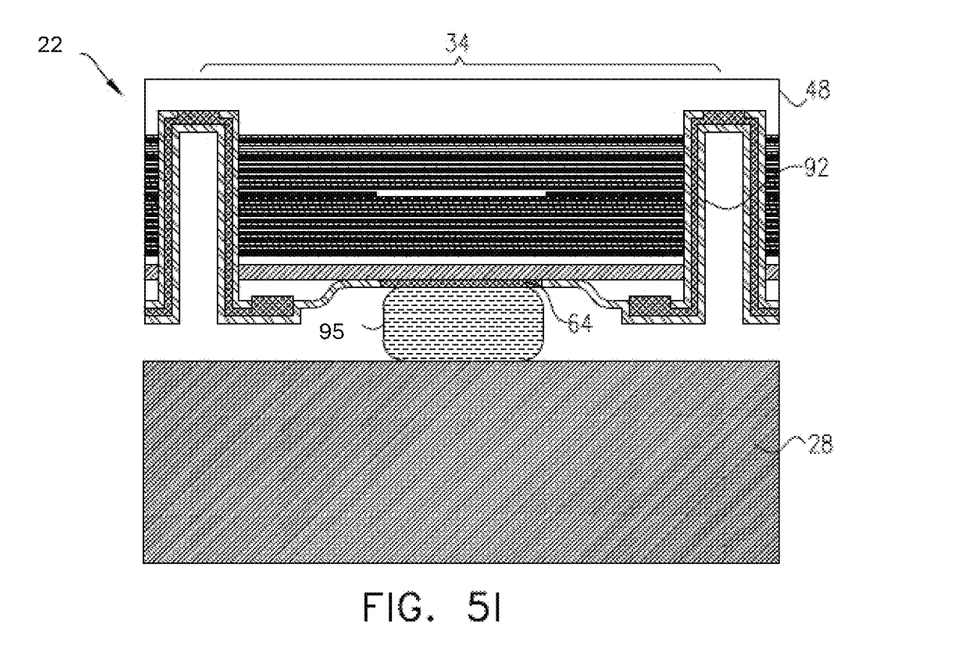

FIGS. 5A-5I are schematic sectional views illustrating stages in fabrication of an integrated emitter array, in accordance with an embodiment of the invention. The result of this fabrication process, shown in FIG. 5I, is a stamp 22 comprising an array of integrated emitter modules 34. In describing this process, transistor 26 in module 34 is assumed to be an HBT. The process may be modified, mutatis mutandis, to form BJTs of other types.

The process begins with sequential deposition of lower DBR 50, oxide aperture 56, optically active layer 52, and upper DBR 54 on III-V semiconductor substrate 48, as shown in FIG. 5A. Additional epitaxial layers are deposited to form emitter 58, base 62, and collector 60, as shown in FIG. 5B. Transistor 26 is then patterned by etching through an appropriate area of collector 60 to expose base 62, as shown in FIG. 5C.

Trenches 90 are etched through the epitaxial layers of transistor 26 and VCSEL 24 to create an array of mesas 92, as shown in FIG. 5D. (Only a single mesa is shown in FIGS. 5D-5I for the sake of simplicity.) Alternatively, other, more complex mesa geometries may be created. Passivation layer 70 is formed over mesa 92, for example by a suitable oxidation process, as shown in FIG. 5E. Openings are etched through passivation layer 70 and then filled with metal, for example by deposition of a copper layer, to form base terminal 64 and collector terminal 66, as shown in FIG. 5F. Metal layer 68 is deposited over passivation layer 70 to connect collector terminal 66 to a drive voltage line 94 on substrate 48, as shown in FIG. 5G. Passivation layer 72 is then deposited over metal layer 68, to isolate collector terminal 66 while leaving base terminal 64 exposed, as shown in FIG. 5H.

Substrate 48 is thinned and diced to create stamps 22, which are then flipped and bonded to respective silicon dies 28, as shown in FIG. 5I. (This step may be carried out before or after the silicon wafer is diced to create die 28.) Base terminal 64 is connected to the respective control circuit on silicon die 28, for example by a solder bump 95 or any other suitable type of conductive bond.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An integrated emitter device, comprising:
a silicon die, comprising an array of control circuits; and
a plurality of integrated emitter modules disposed on the silicon die, each integrated emitter module comprising a single epitaxial stack comprising multiple layers of III-V semiconductor compounds, which define:
a vertical emitter comprising an optically active layer and upper and lower distributed Bragg reflectors (DBRs) on opposing sides of the optically active layer; and
a transistor in series with the vertical emitter and comprising a terminal in contact with a respective one of the control circuits, so as to actuate the vertical emitter in response to a control signal applied to the terminal by the respective one of the control circuits,
wherein the transistor comprises a base, a collector, and an emitter, wherein the base and the collector are disposed over the upper DBR, outside a cavity of the vertical emitter, while the emitter of the transistor is disposed between the optically active layer and one or more of the layers of the upper DBR.

2. The device according to claim 1, wherein the transistor comprises a heterojunction bipolar transistor (HBT).

3. The device according to claim 1, wherein the transistor comprises a bipolar junction transistor (BJT).

4. The device according to claim 1, wherein the optically active layer comprises quantum wells.

5. The device according to claim 1, wherein the vertical emitter is configured as a vertical-cavity surface-emitting laser (VCSEL).

6. The device according to claim 1, wherein the vertical emitter in each of the integrated emitter modules comprises a III-V semiconductor substrate, wherein the lower DBR is disposed on the substrate, the optically active layer is disposed over the lower DBR, and the upper DBR is disposed over the optically active layer, and wherein the vertical emitter is configured to emit optical radiation through the III-V semiconductor substrate when the control signal is applied to the terminal of the transistor.

7. The device according to claim 6, wherein the terminal of the transistor is bonded to a contact on the silicon die, whereby the vertical emitter emits the optical radiation through the III-V semiconductor substrate in a direction away from the silicon die.

8. A method for manufacturing, comprising:
fabricating an array of control circuits on a silicon die;
fabricating a plurality of integrated emitter modules, each integrated emitter module comprising a single epitaxial stack comprising multiple layers of III-V semiconductor compounds, which define:
   a vertical emitter comprising an optically active layer and upper and lower distributed Bragg reflectors (DBRs) on opposing sides of the optically active layer; and
   a transistor in series with the vertical emitter and comprising a terminal,
   wherein the transistor comprises a base, a collector, and an emitter, wherein the base and the collector are disposed over the upper DBR, outside a cavity of the vertical emitter, while the emitter of the transistor is disposed between the optically active layer and one or more of the layers of the upper DBR; and
bonding the terminal of the transistor in each of the integrated emitter modules to a respective one of the control circuits, whereby the vertical emitter is actuated in response to a control signal applied to the terminal by the respective one of the control circuits.

9. The method according to claim 8, wherein the transistor comprises a heterojunction bipolar transistor (HBT).

10. The method according to claim 8, wherein the transistor comprises a bipolar junction transistor (BJT).

11. The method according to claim 8, wherein the optically active layer comprises quantum wells.

12. The method according to claim 8, wherein the vertical emitter is configured as a vertical-cavity surface-emitting laser (VCSEL).

13. The method according to claim 8, wherein fabricating the plurality of integrated emitter modules comprises depositing the lower DBR on a III-V semiconductor substrate, depositing the optically active layer over the lower DBR, and depositing the upper DBR over the optically active layer, wherein the vertical emitter is configured to emit optical radiation through the III-V semiconductor substrate when the control signal is applied to the terminal of the transistor.

14. The method according to claim 13, wherein bonding the terminal comprises bonding the terminal of the transistor to a contact on the silicon die, whereby the vertical emitter emits the optical radiation through the III-V semiconductor substrate in a direction away from the silicon die.

* * * * *